(12) United States Patent
Brandl et al.

(10) Patent No.: US 9,431,878 B2
(45) Date of Patent: Aug. 30, 2016

(54) ELECTRIC MACHINE WITH ENCLOSED, AUTONOMOUS COOLING MEDIUM CIRCUIT

(75) Inventors: Konrad Brandl, Thalmassing (DE); Vladimir Danov, Erlangen (DE); Klaus Dennerlein, Erlangen (DE); Bernd Gromoll, Baiersdorf (DE); Jürgen Hofmann, Spalt (DE); Patryk Piotrowski, Nürnberg (DE); Andreas Schröter, Erlangen (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 364 days.

(21) Appl. No.: 13/996,995

(22) PCT Filed: Dec. 13, 2011

(86) PCT No.: PCT/EP2011/072518
§ 371 (c)(1),
(2), (4) Date: Jun. 21, 2013

(87) PCT Pub. No.: WO2012/084585
PCT Pub. Date: Jun. 28, 2012

(65) Prior Publication Data
US 2013/0270939 A1    Oct. 17, 2013

(30) Foreign Application Priority Data
Dec. 23, 2010   (DE) .................. 10 2010 064 010

(51) Int. Cl.
*H02K 9/19* (2006.01)
*H02K 1/20* (2006.01)
(Continued)

(52) U.S. Cl.
CPC ........ *H02K 9/19* (2013.01); *H02K 1/20* (2013.01); *H02K 1/32* (2013.01); *H02K 5/20* (2013.01)

(58) Field of Classification Search
CPC ............ H02K 9/19; H02K 1/20; H02K 5/20; H02K 1/32
USPC .................................................. 310/60 A, 61
See application file for complete search history.

(56) References Cited

U.S. PATENT DOCUMENTS 3,009,072 A * 11/1961 Richard .......................... 310/57
3,060,335 A * 10/1962 Greenwald ..................... 310/54
(Continued)

FOREIGN PATENT DOCUMENTS

CN    201298784 Y    8/2009
CN    201504150 U    6/2010
(Continued)

OTHER PUBLICATIONS
Machine translation of DE 19635196 A1.*

*Primary Examiner* — Naishadh Desai
(74) *Attorney, Agent, or Firm* — Henry M. Feiereisen LLC.

(57) ABSTRACT

An electric machine has a base body with a stator, a rotor shaft mounted in the base body, and a heat exchanger. Cooling ducts for a liquid cooling medium are arranged in the base body. The rotor shaft is embodied as a hollow shaft through which the liquid cooling medium can flow. The heat exchanger dissipates heat contained in the liquid cooling medium to the surroundings of the electric machine. The heat exchanger, the rotor shaft and the cooling ducts are fluidically connected in series, producing a closed circuit for the liquid medium. A feed element is arranged to co-rotate with the rotor shaft. The feed element is inserted in the closed circuit for the liquid cooling medium to forcibly circulate the liquid cooling medium in the closed circuit as the rotor shaft for the liquid cooling medium rotates.

4 Claims, 2 Drawing Sheets

(51) Int. Cl.
*H02K 1/32* (2006.01)
*H02K 5/20* (2006.01)

(56) References Cited

U.S. PATENT DOCUMENTS

| | | | |
|---|---|---|---|
| 6,191,511 | B1 | 2/2001 | Zysset |
| 7,102,267 | B2 | 9/2006 | Gromoll et al. |
| 7,362,027 | B2 | 4/2008 | Fichtner et al. |
| 2011/0140550 | A1 | 6/2011 | Brandl et al. |

FOREIGN PATENT DOCUMENTS

| | | | |
|---|---|---|---|
| DE | 9112631 U1 | 2/1993 | |
| DE | 19635196 A1 * | 3/1998 | ............... H02K 9/19 |
| DE | 102009029716 A1 | 12/2009 | |
| GB | 2357377 A | 6/2001 | |
| SU | 106727 A1 | 11/1956 | |
| SU | 1244750 A1 | 7/1986 | |
| SU | 1365255 A1 | 1/1988 | |
| SU | 1601699 A1 | 10/1990 | |

* cited by examiner

ELECTRIC MACHINE WITH ENCLOSED, AUTONOMOUS COOLING MEDIUM CIRCUIT

CROSS-REFERENCES TO RELATED APPLICATIONS

This application is the U.S. National Stage of International Application No. PCT/EP2011/072518, filed Dec. 13, 2011, which designated the United States and has been published as International Publication No. WO 2012/084585, and which claims the priority of German Patent Application, Serial No. 10 2010 064 010.7, filed Dec. 23, 2010, pursuant to 35 U.S.C. 119(a)-(d).

BACKGROUND OF THE INVENTION

The present invention relates to an electric machine,
wherein the electric machine has a base body and a rotor shaft,
wherein the base body comprises at least one stator,
wherein cooling ducts for a liquid cooling medium are arranged in the base body,
wherein the rotor shaft is mounted in the base body in such a way that the rotor shaft can rotate about a rotational axis.

Such electric machines are generally known. Purely by way of example, reference is made to DE 91 12 631 U1.

With liquid cooling media, in particular water, a substantially more efficient cooling of electric machines is possible than with gaseous cooling media, in particular air. In many cases, therefore, electric machines are equipped with water cooling.

In the prior art, for the realization of such cooling, connections are provided for the supply and discharge of the liquid cooling medium. The circulation of the liquid cooling medium is however not guaranteed by the electric machine as such. The cooling medium itself must as such also be provided from the outside. Moreover, in the prior art, at least as a rule, only the base body is water-cooled. Cooling of the rotor is, as a rule, only realized with air.

SUMMARY OF THE INVENTION

The object of the present invention is to design an electric machine of the type referred to in the introduction in such a way that an efficient cooling of the electric machine is realized in a simple manner.

According one aspect of the invention, an electric machine is designed in such a way
that the electric machine has a heat exchanger in addition to the base body and the rotor shaft,
that the rotor shaft is embodied as a hollow shaft through which liquid cooling medium can flow,
that the heat exchanger serves to output heat contained in the liquid cooling medium to the surroundings of the electric machine,
that the heat exchanger, the rotor shaft, and the cooling ducts are fluidically connected to one another in pairs so that a closed circuit for the liquid medium is produced, and
that a feed element is arranged in a rotationally fixed fashion on the rotor shaft, said feed element being connected into the closed circuit for the liquid cooling medium and being used to forcibly circulate the liquid cooling medium as the rotor shaft rotates about the rotational axis in the closed circuit for the liquid cooling medium.

The result of this is that the amount of heat which can be discharged from the base body and the rotor shaft can be substantially increased without requiring a connection to a cooling medium supply facility external to the machine.

The majority of the heat to be discharged accumulates in the stator of the electric machine. Preferably, therefore, the liquid cooling medium flows, due to the forced circulation by the feed element, from the heat exchanger to the rotor shaft, from there to the cooling ducts, and from there back to the heat exchanger.

Preferably, the feed element is connected between the rotor shaft and the cooling ducts into the closed circuit for the liquid cooling medium. Due to this measure, particularly simple structural embodiments are possible in the realization of the feed element. In particular, provision can be made for the realization of the feed element,
that the feed element is designed as a blade wheel surrounding the rotor shaft radially on the outside, feeding the liquid cooling medium radially outwards,
that the feed element is surrounded by a feed housing arranged in a rotationally fixed fashion on the base body,
that the rotor shaft has at least one radial aperture in an area surrounded by the feed housing, and
that the connection from the rotor shaft to the cooling ducts is formed as at least one connection line going radially outwards from the feed housing.

It is possible for the connection from the heat exchanger to the rotor shaft to be embodied in such a way that the liquid cooling medium is supplied axially to the rotor shaft. This embodiment is fluidically optimum.

As an alternative, it is possible for the connection from the heat exchanger to the rotor shaft to be embodied in such a way that the liquid cooling medium is supplied radially to the rotor shaft. This arrangement may be necessary in practice if the rotating part of a transmitter facility for a position, revolution speed, or acceleration-dependent signal is arranged on the rotor shaft.

BRIEF DESCRIPTION OF THE DRAWING

Further advantages and details can be derived from the following description of exemplary embodiments in conjunction with the drawings. These show, as principle representations.

DETAILED DESCRIPTION OF PREFERRED EMBODIMENTS

Figure 1:
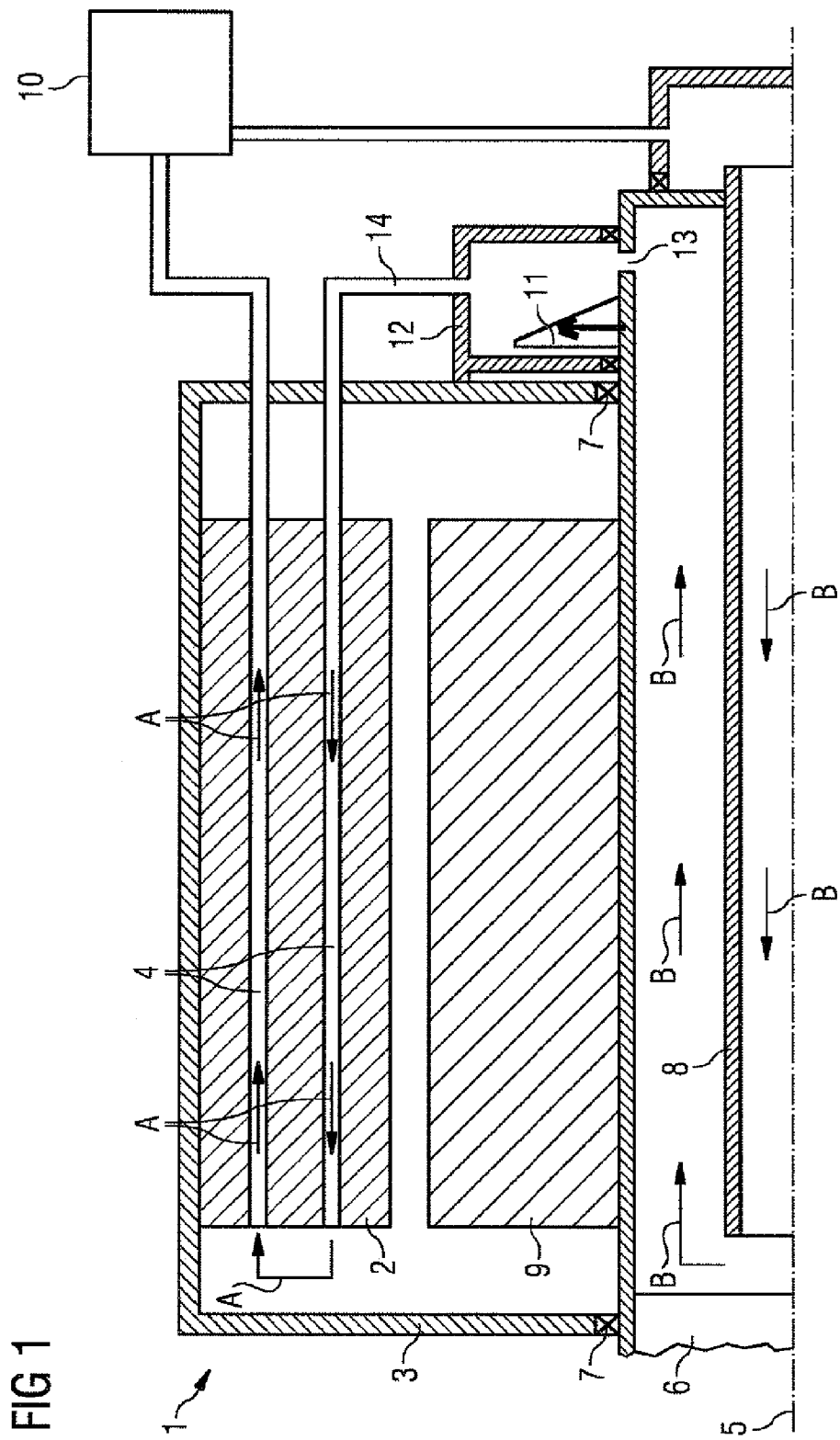
FIG. 1 an electric machine,
FIG. 2 in schematic form, a part of the electric machine from FIG. 1, and
FIG. 3 an alternative arrangement of the part of the electric machine from FIG. 1 shown in FIG. 2.

According to FIG. 1, an electric machine has a base body 1. The base body 1 comprises at least one stator 2. If appropriate, the base body 1 can comprise, in addition to the stator 2, further elements, such as a housing 3. As an alternative, the electric machine can be arranged as an electric machine without a housing. Arranged in the base body 1, whether in the stator 2 or in the housing 3 of the electric machine ,if provided, are cooling ducts 4 for a liquid cooling medium. The flow of the cooling medium in the cooling ducts 4 is indicated in FIG. 1 by corresponding arrows, which are designated in FIG. 1 by the reference character A. The liquid cooling medium is, as a rule, water.

The cooling ducts 4 can be arranged as required. For example, they can be formed as cooling ducts running axially. The term "axially" in this context, and also elsewhere, is in relation to a rotational axis 5 of the electric machine. It signifies a direction parallel to the rotational axis 5.

In the case of an axial course, the cooling ducts 4 can be simple continuous cooling ducts 4, such that infeed of the liquid cooling medium takes place at one axial end, and the outfeed of the cooling medium takes place at the other axial end. As a rule, however, the infeed and outfield of the liquid cooling medium takes place at the same axial end of the electric machine.

As an alternative to an axial course of the cooling ducts 4, the cooling ducts can run tangentially. The term "tangentially" is likewise in relation to the rotational axis 5. It signifies a direction at a constant distance from the rotational axis 5, about the rotational axis 5.

The precise embodiment of the cooling ducts 4 is not as such a subject matter of the present invention. Rather, the cooling ducts 4 and their possible designs and arrangements are generally known in the prior art.

The electric machine further exhibits a rotor shaft 6. The rotor shaft 6 is mounted in bearings 7 of the electric machine. The rotor shaft 6 can therefore rotate about the rotational axis 5.

The rotor shaft 6 is formed according to FIG. 1 as a hollow shaft. The liquid cooling medium can likewise flow through it. This is indicated in FIG. 1 by arrows, which are provided with the reference character B.

The embodiment of the rotor shaft 6 as a hollow shaft can be effected as required. In principle it is possible for the liquid cooling medium to be fed in at one axial end of the rotor shaft 6 into the rotor shaft 6, and fed out at the other axial end. As a rule, however, such an arrangement is encumbered by substantial disadvantages in other respects. As a general rule, therefore, the rotor shaft 6 has an inner tube 8, such that, as represented in FIG. 1, the liquid cooling medium initially flows axially in the inner tube 8, then emerges from the inner tube 8 at the end of the inner tube 8 and therefore then flows back in the opposite direction in the intermediate space between the rotor shaft 6 and the inner tube 8.

The transition of the cooling medium from the inner tube 8 to the rotor shaft 6 can be arranged as required. For example, the inner tube 8, as represented in FIG. 1, can be open at its front side end. As an alternative or additionally, the inner tube 8 can exhibit radial boreholes or other radial apertures. The term "radial" in this context, as with the terms "axial" and "tangential", are related to the rotational axis 5. The term "radial" designates a direction orthogonal to the rotational axis 5, and specifically to the rotational axis 5 to or from it.

Rotor shafts 6 designed as hollow shafts with an inner tube 8 located in the interior are known as such. Detailed explanations regarding the embodiment of the rotor shaft 6 are therefore not necessary.

Due to the liquid cooling medium flowing through the rotor shaft 6, the rotor shaft 6 is cooled. Due to the cooling of the rotor shaft 6, a rotor 9 of the electric machine, arranged in a rotationally fixed fashion on the rotor shaft 6, is indirectly cooled.

The electric machine further exhibits a heat exchanger 10. The heat exchanger 10 serves to output heat contained in the liquid cooling medium to the surroundings, mostly to the ambient air.

The heat exchanger 10 can be embodied as required. The heat exchanger 10 is often designed as a finned radiator. Finned radiators are generally known as such with water-cooled automobile engines. The finned radiator can be arranged as required, alternatively horizontally or vertically. A fan may also be assigned to it, in order to optimize the cooling effect of the heat exchanger 10.

If the electric machine exhibits a fan, which is arranged in a rotationally fixed fashion on the rotor shaft 6, it is also possible for the heat exchanger 10 to be located directly outside on the base body 1 or integrated in another manner into the base body 1.

The heat exchanger 10, the rotor shaft 6, and the cooling ducts 4 are fluidically connected to one another in pairs. The heat exchanger 10 is therefore connected to the rotor shaft 6 on the one side, and to the cooling ducts 4 on the other side. Likewise, the rotor shaft 6 is connected to the heat exchanger 10 on the one side and to the cooling ducts 4 on the other side. Likewise, in an analogous manner, the cooling ducts 4 are connected to the heat exchanger 10 on the one side and to the rotor shaft 6 on the other side.

In order to achieve a forcible circulation of the liquid cooling medium, a feed element 11 is provided, which is connected into the closed cooling circuit for the liquid cooling medium. The feed element 11 is arranged in a rotationally fixed fashion on the rotor shaft 6, in accordance with FIGS. 1 to 3, such that, when the rotor shaft 6 rotates, it rotates likewise. By means of the feed element 11, when the rotor shaft 6 rotates, the liquid cooling medium is forcibly circulated about the rotational axis 5 in the closed circuit for the liquid cooling medium. The feed direction of the liquid cooling medium is preferably such that the liquid cooling medium, due to the forcible circulation, flows through the feed element 11 from the heat exchanger 10 to the rotor shaft 6, from the rotor shaft 6 to the cooling ducts 4, and from the cooling ducts 4 back to the heat exchanger 10. Naturally, the liquid cooling medium, after it has flowed from the heat exchanger 10 to the rotor shaft 6, flows through the rotor shaft 6, before it flows to the cooling ducts 4. Likewise, the liquid cooling medium naturally flows through the cooling ducts 4 before it flows back to the heat exchanger 10.

Figure 2:
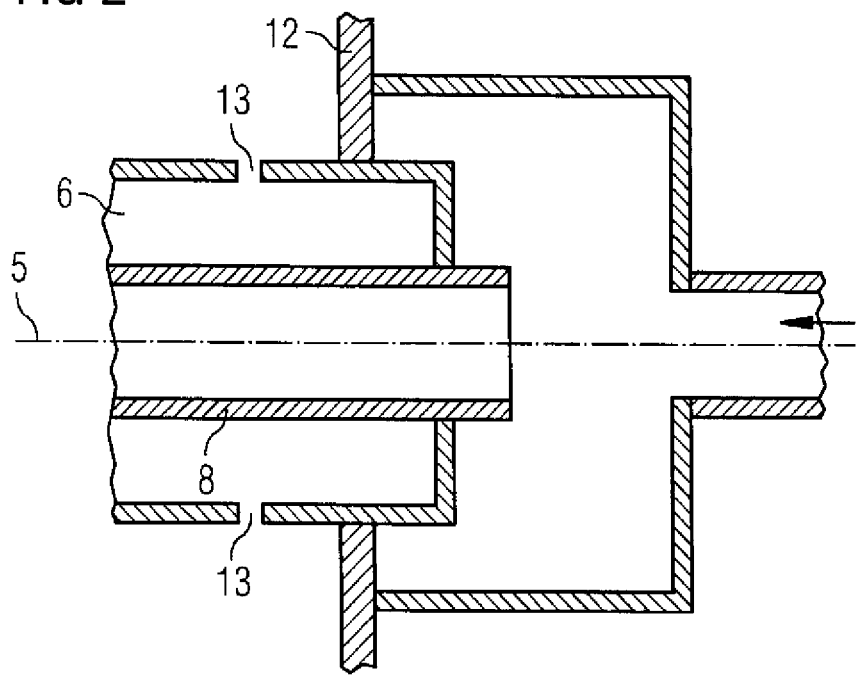
Figure 3:
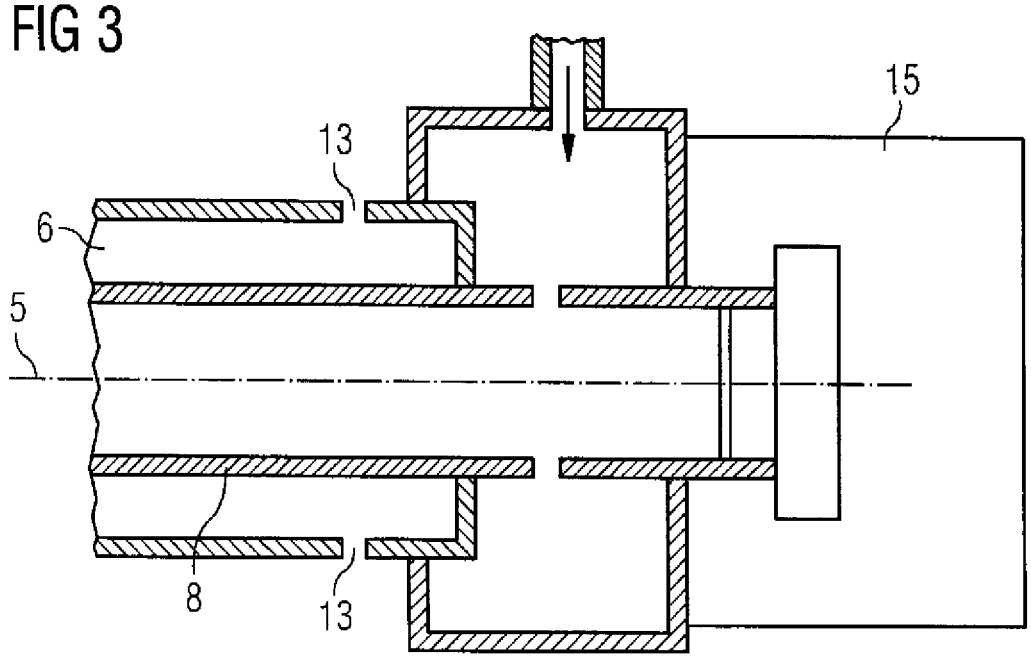

The feed element 11 can in principle be connected at any desired point into the closed circuit for the liquid cooling medium. Preferably, the feed element 11, corresponding to the representation in FIGS. 1 to 3, is connected between the rotor shaft 6 and the cooling ducts 4 into the closed circuit for the liquid cooling medium. In this case, according to FIGS. 1 to 3, in the mechanical-structural respect, the feed element 11 can in particular be formed as a blade wheel, surrounding the rotor shaft 6 radially on the outside and feeding the liquid cooling medium from radially inwards to radially outwards. The feed element 11 in this embodiment is surrounded by a feed housing 12, which is arranged in a rotationally fixed fashion on the base body 1. The rotor shaft 6 in this case exhibits, in an area which is surrounded by the feed housing 12, at least one radial aperture 13. In addition, in this case there is a connection from the rotor shaft 6 to the cooling ducts 4, through which the liquid cooling medium flows from the rotor shaft 6 to the cooling ducts 4, is formed as a connection line 14, which moves radially outwards from the feed housing 12.

The connection from the heat exchanger 10 to the rotor shaft 6, or, more precisely, as a rule to the inner tube 8, can be designed as required. The optimum arrangement fluidically is when the liquid cooling medium is conducted axially to the rotor shaft 6 corresponding to the representation in FIG. 2. In many cases, however, corresponding to the representation in FIG. 3, a transmitter facility 15 is provided, which serves to generate a position, revolution speed, or acceleration-dependent signal. For example, the transmitter facility 15 can be designed as a resolver or as an incremental transmitter or similar transmitter facility. In this case, an axial feed of the liquid cooling medium to the rotor shaft 6 is not possible. In this case, the feed of the liquid cooling medium to the rotor shaft 6, corresponding to the representation in FIG. 3, is not axial but radial.

The present invention has many advantages. In particular, a good thermal cooling of the electric machine in achieved in a simple manner, without the need for an external cooling medium connection. The structural arrangement is also simple, reliable, and almost maintenance-free.

The foregoing description serves exclusively to explain the present invention. The scope of protection of the present invention should by contrast be determined exclusively by the appended claims.

The invention claimed is:

1. An electric machine, comprising:
   a base body comprising at least one stator and cooling ducts for a liquid cooling medium,
   a rotor shaft mounted in the base body for rotation about a rotational axis, the rotor shaft formed as a hollow shaft having a first axial end and a second axial end and comprising an inner tube co-rotating with the hollow shaft and configured for flow of the liquid cooling medium therethrough from the first axial end to the second axial end and thereafter returning to the first end in an opposite direction in an intermediate space disposed between the rotor shaft and the inner tube, the rotor shaft having at least one radial aperture located at the first end,
   a heat exchanger configured to transfer heat contained in the liquid cooling medium to surroundings of the electric machine, wherein the heat exchanger, the rotor shaft and the cooling ducts are fluidically connected to one another in series, thereby producing a closed circuit for the liquid cooling medium, and
   a feed element co-rotating with the rotor shaft and constructed as a blade wheel radially surrounding an outside of the rotor shaft at the first axial end and conveying the liquid cooling medium radially outwards from the intermediate space to the cooling ducts in order to forcibly circulate the liquid cooling medium in the closed circuit as the rotor shaft rotates,
   a feed housing arranged in a rotationally fixed fashion on the base body and having an interior space that is sealed against the rotor shaft at the first axial end, with the feed housing surrounding the feed element and having an outlet connected to the cooling ducts by way of at least one connection line extending radially outwards from the feed housing,
   wherein the at least one radial aperture supplies the liquid cooling medium to the interior of the feed housing.

2. The electric machine of claim 1, wherein due to the forced circulation by the feed element, the liquid cooling medium flows from the heat exchanger to the rotor shaft, from the rotor shaft to the cooling ducts and from the cooling ducts back to the heat exchanger.

3. The electric machine of claim 1, wherein the heat exchanger is fluidically connected to the rotor shaft such that the liquid cooling medium is fed axially to the rotor shaft.

4. The electric machine of claim 1, wherein the heat exchanger is fluidically connected to the rotor shaft such that the liquid cooling medium is fed radially to the rotor shaft.

* * * * *